(12) United States Patent
Smetz

(10) Patent No.: US 8,490,378 B2
(45) Date of Patent: Jul. 23, 2013

(54) SHORTENING ANNULAR FORK FOR SHORTENING A CHAIN STRAND

(75) Inventor: Reinhard Smetz, Kleinerdlingen (DE)

(73) Assignee: RUD Ketten Rieger & Dietz GmbH u. Co. KG, Aalen (DE)

( * ) Notice: Subject to any disclaimer, the term of this patent is extended or adjusted under 35 U.S.C. 154(b) by 275 days.

(21) Appl. No.: 12/737,112

(22) PCT Filed: Feb. 27, 2009

(86) PCT No.: PCT/EP2009/001417
§ 371 (c)(1),
(2), (4) Date: Jan. 31, 2011

(87) PCT Pub. No.: WO2009/149777
PCT Pub. Date: Dec. 17, 2009

(65) Prior Publication Data
US 2011/0126507 A1 Jun. 2, 2011

(30) Foreign Application Priority Data
Jun. 13, 2008 (DE) .......................... 10 2008 028 111

(51) Int. Cl.
*F16G 15/04* (2006.01)
*B66C 1/14* (2006.01)

(52) U.S. Cl.
USPC .............................. 59/93; 24/116 R; 294/82.1

(58) Field of Classification Search
USPC ....................... 59/78, 93; 24/116 R; 294/82.1
See application file for complete search history.

(56) References Cited

U.S. PATENT DOCUMENTS

| 4,151,708 A * | 5/1979 | Smetz | ............................... 59/93 |
| 5,724,804 A * | 3/1998 | Smetz | ............................... 59/93 |
| 8,220,244 B2 * | 7/2012 | Smetz | ............................... 59/93 |

FOREIGN PATENT DOCUMENTS

| AT | 391 927 B | 12/1990 |
| DE | 23 10 344 A1 | 9/1973 |
| WO | WO 97/23404 A1 | 7/1997 |
| WO | WO 2004/087554 A1 | 10/2004 |
| WO | WO 2006/114201 A1 | 11/2006 |

* cited by examiner

*Primary Examiner* — David B Jones
(74) *Attorney, Agent, or Firm* — Mark P. Stone

(57) ABSTRACT

The invention relates to a shortening device (1) for shortening a chain strand (23), the shortening device comprising a connecting section (3) with at least one connecting opening (7), a shortening member (4, 26), at least one anchoring receptacle (7) for receiving an end link (24*a*) of the chain strand (23), said anchoring receptacle being arranged on a side of the connecting section (3) which faces the shortening member (4, 26) and being closed by a retaining pin (8) inserted into a cutout (32), and a web (5) which connects the connecting section (3) to the shortening member (4, 26) and is arranged at an end of the cutout (32) pointing in the longitudinal direction. In order to provide a lighter and smaller shortening device (1), it is provided according to the invention that the connecting opening (7) is designed as a closed eye (7).

20 Claims, 8 Drawing Sheets

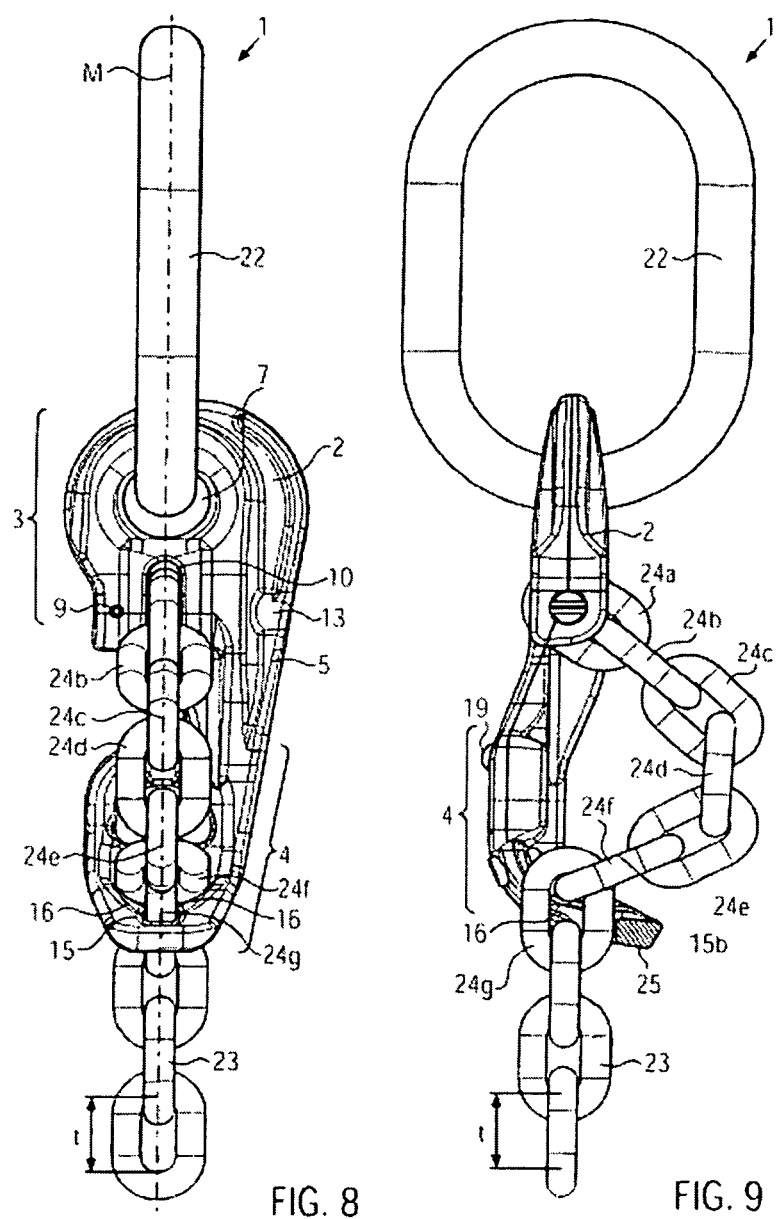

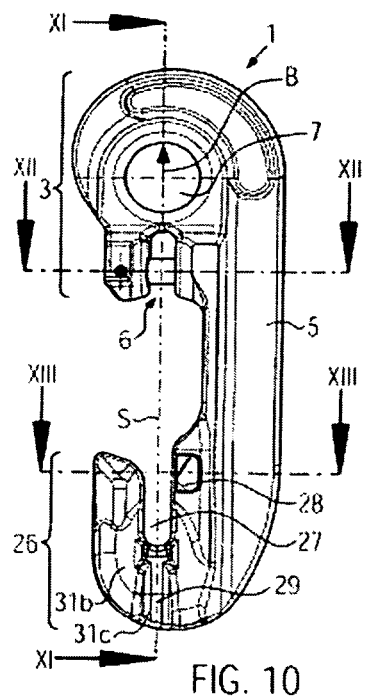
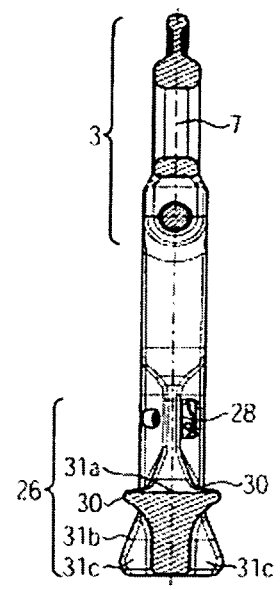
FIG. 10
FIG. 11
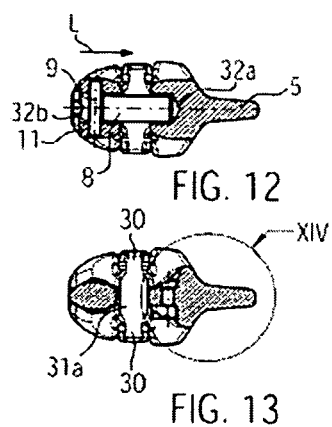
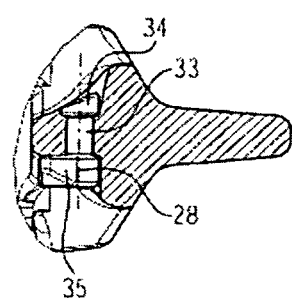
FIG. 12
FIG. 14
FIG. 13

SHORTENING ANNULAR FORK FOR SHORTENING A CHAIN STRAND

The invention relates to a shortening device for shortening a chain strand, the shortening device comprising a connecting section with at least one connecting opening, a shortening member, at least one anchoring receptacle for receiving an end link of the chain strand, said anchoring receptacle being arranged on a side of the connecting section which faces the shortening member and being closed by a retaining pin inserted into a cutout, and a web which connects the connecting section to the shortening member and is arranged at an end of the cutout pointing in the longitudinal direction.

EP 0 868 386 B1 describes a coupling device for a chain with a shortening element. The embodiments shown in FIGS. 1 to 6 comprise a hook-like connecting bow for receiving a connecting member provided with a flattening. In the embodiments of FIGS. 1, 5 and 6, the opening of the connecting bow is closed by a locking pin. While the embodiments of FIGS. 1 to 4 comprise shortening hooks, a shortening claw is shown in FIGS. 5 and 6.

EP 0 092 382 B1 also discloses shortening devices of which the shortening member is embodied as shortening claw. The embodiments shown in FIGS. 6 to 12 each comprise a slot with two aligned cutouts for receiving a retaining pin by which an end link of the lifting chain can be connected to the shortening device. For the connection to a lifting gear, the shortening devices comprise oblong holes for receiving a shackle pin at their upper ends.

WO 2004/087554 A1 describes a load hook which is connected to a lifting chain via a shortening member embodied as a shortening plate. The end link of the lifting chain is held in a slot via a retaining pin inserted in two aligned cutouts, the retaining pin being arranged in a through hole. The retaining pin rests on a shoulder on one side of the hole, while the other side of the hole is closed by a pin.

WO 95/17620 shows a shortening device which comprises, apart from a shortening claw, a shortening plate. The shortening claw can be coupled to any site of a chain strand via the shortening plate. The pull-through opening of the shortening plate is formed here by two intersecting slots.

EP 1 315 919 B1 discloses a shortening device with two opposite shortening plates connected via a back. Both shortening plates comprise two intersecting slots for pulling through a chain strand, one of the slots being longer and limited by two supporting zones which each serve for supporting the bow-shaped end of one chain link each. A pin arranged between the shortening plates and movable against a spring is used to secure the inserted chain strands, the pin intersecting the cross-shaped pull-through openings of both shortening plates.

EP 0 868 384 B1 describes a coupling link for connecting two chain strands. At both ends of the coupling link, slot-like receptacles for chain links are arranged which are closed via a retaining pin. One shortening member is associated to each receptacle, the shortening member being embodied, for example, like a shortening plate or a shortening hook.

EP 0 767 880 B1 describes a shortening device comprising an essentially U-shaped bow. The opposite ends of the bow are converging and connected to each other via a stud. While the further opening at the bow-shaped section of the bow is used as pull-through opening for a chain strand, indentations are provided each in the opposite ends of the bow which are used as supporting surface for holding a chain link. Via the stud, an end link of a lifting chain can be connected to the shortening device. In a further embodiment of the shortening device, the two legs are connected via a cross web. A retaining pin is provided for anchoring an end link of the chain, the retaining pin being inserted in a through hole intersecting both ends and limiting, together with the cross web, a slot for receiving the chain link.

EP 0 868 387 B1 describes a coupling device for chains, comprising a basic body with a connecting ring as well as two symmetric shortening elements. The shortening elements comprise shortening members which are embodied as shortening claws with one pocket each for receiving a chain link, as well as receptacles for an end link of a chain which are arranged between the connecting ring and the shortening member and comprise a pin inserted in a through hole.

DE 3 319 774 C2 shows a shortening device which is embodied like a shortening claw. The shortening device is connected to a closed connecting member via a closed retaining ring. Underneath the retaining ring, a slot with a through hole provided with a shoulder for receiving a retaining pin is provided via which an end link can be connected to the shortening device. The slot ends in the frame-like pull-through opening of the shortening member situated below.

WO 2006/114201 A1, which is considered as closest prior art, shows a shortening device with a hook-like connecting bow into which a connecting link provided with a flattening can be fitted. The connecting bow is connected to the shortening member situated below via an oblong web. The insertion opening of the connecting bow pointing into the direction of the shortening member is closed with a locking pin which is simultaneously used as retaining pin for the end link of the chain strand.

A disadvantage of the shortening devices known from prior art is their large dimensions and high weight which render the handling of the shortening devices difficult.

The object of the present invention therefore is to design the known shortening devices smaller and lighter.

According to the invention, this object is achieved by embodying the connecting opening as closed eye.

The closed eye advantageously increases the stability of the shortening device as the bending moments occurring in the region of the connecting opening when tensile loads are introduced into the shortening device are reduced. Thus, the size of the shortening device can be altogether reduced, while the same stability is maintained. In the manufacture of the shortening device, for example during forging, the stability-increasing effect of the closed eye also proves to be advantageous.

The solution according to the invention can be further developed by various, independent embodiments each advantageous for themselves. Below, these embodiments and the respective advantages connected to the embodiments will be briefly discussed.

The solution according to the invention is advantageous in that the anchoring receptacle is formed by a separate opening the size of which can be changed independent of the connecting opening. Thereby, the clear diameter of the anchoring receptacle can be limited such that only chains suited for the shortening device whose legs or bows do not exceed a predetermined cross-sectional area or width can be received with their end link in the anchoring receptacle.

To avoid chains with a too large leg cross-section from being inserted into the anchoring receptacle of the shortening device, the clear diameter of the anchoring receptacle can be smaller than or equal to the diameter of the retaining pin. The diameter of the retaining pin can be embodied large enough so as to exceed the clear diameter of an end link of a too small chain not admitted for use with the shortening device according to the invention and thus prevent the assembly of the too small chain.

In a further advantageous embodiment, the clear diameter of the anchoring receptacle can be approximately equal to the clear diameter of the insertion slot of the shortening member. Thereby, the function of a gage is associated to the anchoring receptacle which defines the largest admissible cross-section of the links of the chain strand to be fitted into the shortening member. This ensures that no end link of a chain which is, due to the cross-section of its chain links, not securely held in the shortening member or which exceeds the lifting capacity of the shortening device or of the anchoring receptacle, respectively, can be inserted into the anchoring receptacle.

Moreover, the shortening device can comprise a distance between the retaining pin and the shortening member arranged underneath the retaining pin which corresponds at least to four times the pitch of the links of a chain strand whose end link can be received at the anchoring receptacle. The shortening of a chain by a shortening device usually requires a lateral relocation of the chain section arranged between the anchoring receptacle and the shortening member, i.e. the formation of a chain loop. Only by the minimum length of this chain section provided according to the invention, a shortening of the chain by a minimum amount can be achieved, which amount only corresponds to twice the pitch of the chain if the shortening member is embodied as a shortening plate.

According to a further advantageous embodiment, one end of the retaining pin can be held in a blind hole, and the other end of the retaining pin can be held in a through hole closable by a locking pin. By one end of the retaining pin being inserted in a blind hole, the hole for receiving the pin is altogether shortened, whereby the notch effect caused in the shortening device by the hole is reduced and thus the stability of the shortening device is increased.

In a further advantageous embodiment, the shortening member can be formed by a pull-through opening and an insertion slot ending in the pull-through opening. For holding a chain link, pocket-like supporting surfaces can be provided in the shortening member which receive a chain link located transverse with respect to the insertion slot. The ends of the side walls of the insertion slot facing away from the pull-through opening can be connected by a cross bar. This embodiment of the shortening member corresponds to a shortening plate. The shortening plate is advantageous in that the chain can only be inserted through the pull-through opening, and it is not possible for the chain to slip out by lateral shifting in the shortening member.

As an alternative, the shortening member can be embodied as shortening claw by being formed by two hooks being in connection with each other via a back and arranged essentially in parallel, the hooks limiting an insertion slot and forming a pocket for receiving a chain link following the chain link inserted in the insertion slot.

To even further facilitate the insertion of the chains into the shortening member, the shortening member can furthermore be formed of a shortening hook comprising an insertion slot essentially opening in the direction of the connecting section.

In a further advantageous embodiment, the clear diameter of the anchoring receptacle can be smaller than or equal to half the diameter of the connecting opening. In this manner, it is ensured that the flexibility of the chain arrangement in the region of the shortening device is not affected and that the shortening device can sufficiently move with respect to a connecting member located in the connecting opening.

According to a further advantageous embodiment of the shortening device according to the invention, the distance from the end of the connecting opening pointing away from the anchoring receptacle to the end of the opening of the anchoring receptacle pointing away from the connecting opening can be smaller than or equal to 1.25 times the sum of the clear diameter of the anchoring receptacle and the clear diameter of the connecting opening. This design permits a stout structural shape of the connecting section and thereby an altogether compacter design of the shortening device.

For a connection with a lifting device, a master link can be fitted into the closed eye of the shortening device. As an alternative or in addition, in a further advantageous embodiment of the shortening device according to the invention, a connecting member closed by a weld seam can be received in the connecting opening. This embodiment of the shortening device according to the invention offers the advantage of a captive connection between the basic body of the shortening device and a connecting member dimensioned corresponding to the shortening device. Thereby, the connecting member matching the shortening device is always necessarily paired with the shortening device, i.e. the use of an unsuited connecting member with the shortening device is excluded.

Below, the invention will be illustrated by way of example by means of various embodiments with reference to the Figures. Here, the described embodiments only represent possible embodiments that can be modified for the respective application. Individual features that are advantageous separately can be added or omitted in the respective described embodiment according to the above description of the advantageous embodiments.

In the drawings:

FIG. 8 shows another schematic side view of the second embodiment of the invention with a shortened chain strand;

FIG. 9 shows another schematic side view of the second embodiment of the invention according to FIG. 8;

FIG. 10 shows a schematic side view of a third embodiment of the invention, differing from the embodiment shown in FIG. 1 by the shortening member embodied as shortening hook;

FIG. 11 shows a schematic sectional view of the embodiment of FIG. 10 along the intersection line XI-XI;

FIG. 12 shows a schematic sectional view of the embodiment of FIG. 10 along the intersection line XII-XII;

FIG. 13 shows a schematic sectional view of the embodiment of FIG. 10 along the intersection line XIII-XIII;

FIG. 14 shows an enlarged representation of the schematic sectional view of FIG. 13 at the site XIV;

Figure 1:
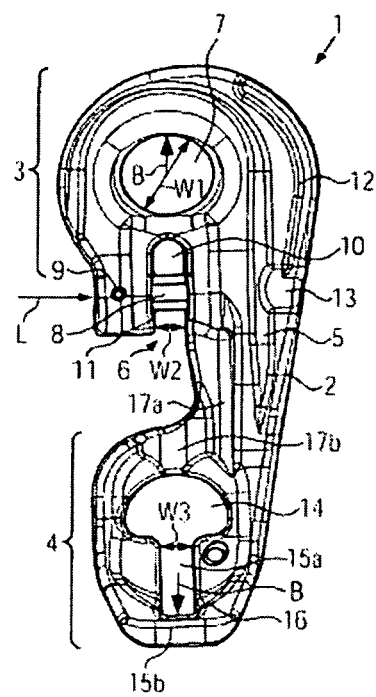
FIG. 1 shows a schematic side view of a first embodiment of the invention.

First, the structure of a shortening device according to the invention will be described with reference to the embodiment of FIG. 1. The shortening device 1 comprises a basic body 2 comprising a connecting section 3, a shortening member 4, a web 5 connecting the connecting section 3 with the shortening member 4, as well as an anchoring receptacle 6. The connecting section 3 is provided with a connecting opening 7 which is embodied as closed eye 7. The connecting opening 7 comprises a circular profile with a clear diameter W1, while the profile of the section of the basic body 2 surrounding the connecting opening 7 is embodied asymmetrically corresponding to the loads which act on the basic body 2 or the connecting section 3, respectively, essentially in a direction of load B. That means, the cross-section of the region of the basic body 2 surrounding the connecting opening 7 enlarges essentially from the side of the connecting section 3 facing away from the web 5 to the side of the connecting section 3 facing the web 5. Simultaneously, the thickness of the region of the basic body 2 surrounding the connecting opening 7 enlarges in the same direction in the projection shown in FIG. 1.

The opening 10 of the anchoring receptacle 6 formed as slot 10 is limited by a retaining pin 8 in the direction of the shortening member 4 arranged below it, i.e. the slot 10 of the anchoring receptacle 6 is closed by the retaining pin 8 which is secured against slipping by a locking pin 9. The locking pin 9 can be embodied, for example, as clamping pin 9. The slot 10 is essentially U-shaped, its bent end facing to the connecting opening 7 in the direction of load B. A side wall of the slot 10 is formed by the surface of the web 5 facing inwards, while the second inner surface of the slot 10 is formed by an extension 11 of the connecting section 3. The clear diameter W2 of the slot 10 is clearly smaller than half of the clear diameter W1.

For receiving the retaining pin 8, the extension 11 comprises a here non-depicted cutout embodied as through hole which is aligned with a cutout in the web 5 embodied as blind hole. The retaining pin 8 as well as the through hole and the blind hole extend in a longitudinal direction L running transversely to the direction of load B.

The web 5 is provided with a widening web 12 at its back opposite to the anchoring receptacle 6, the widening web extending to the shortening member 4. The widening web 12 is interrupted by a cavity 13 which is arranged in a direction transverse to the direction of load B opposite to the retaining pin 8. If a chain strand anchored in the anchoring receptacle 6 is guided over the web 5 transversely to the direction of load B, the chain link following the chain link arranged in the anchoring receptacle 6 can be arranged in the cavity 13. A chain link arranged in the cavity 13 is supported against lateral slipping by the essentially cylindrically shaped basic surface of the cavity 13.

The shortening member 4 comprises an essentially semi-circular pull-through opening 14 of which the bent section points in the direction of the connecting opening 7. An insertion slot 15a with a clear diameter W3 ends in the pull-through opening 14 and is limited by supporting surfaces 16.

The clear diameter W3 of the slot 15a approximately corresponds to the clear diameter W2 of the anchoring receptacle. The end of the slot 15a pointing away from the pull-through opening 14 is limited by a cross bar 15b which connects the side walls of the slot 15a to each other. The web 5 is provided with a flattening 17a or an indentation 17a between the anchoring receptacle 6 and the pull-through opening 14, the flattening or indentation offering space for a chain link that follows the chain link arranged in the anchoring receptacle 6, so that a chain held in the anchoring receptacle 6 can be extended in the direction of load B' in the non-shortened state without interference of the shortening device 1. The indentation 17b offers a corresponding function, namely space for the chain link following the chain link arranged in the indentation 17a.

Figure 2:
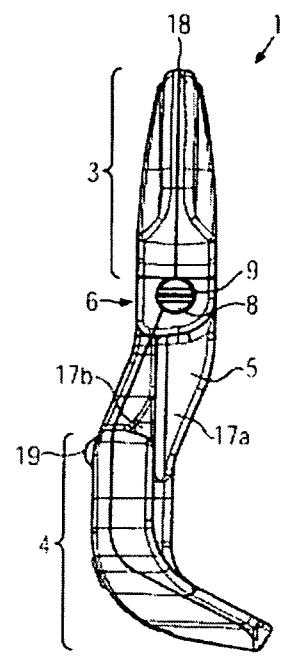
FIG. 2 shows another schematic side view of the first embodiment of the invention.

FIG. 2 shows a further side view of the embodiment of FIG. 1. The connecting section comprises a supporting web 18 surrounding the sections of the connecting opening 7 pointing in the direction of load B and transverse to the direction of load B. The supporting web 18 results in an extension of the cross-sectional profile of the connecting section surrounding the connecting opening 7 and thus in a stiffening of the shortening device 1 in the region of the connecting opening 7.

Underneath the connecting section 3, the web 5 extends essentially transversely with respect to the direction of load B. Thereby, the web 5 evades a chain strand fitted in the anchoring receptacle 6, so that a not shortened chain strand is not deflected by the web 5 or the shortening member 4 following the web. On the side of the web 5 facing away from the shortening member 4, an extension 19 is arranged at the transition from the web 5 to the shortening member 4. If several shortening devices 1 are arranged one next to the other, for example in a connecting member, the extension 19 is used as spacer 19 which ensures the function of shortening members 4 arranged at the back with respect to each other. At the same time, the extension 19 fulfils the function of a wearing zone 19 which ensures that wear occurring when the shortening device 1 is supported at the rear does not affect the bearing cross-section of the shortening member 4 or of the web 5, respectively.

Figure 3:
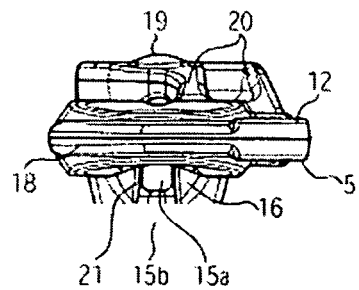
FIG. 3 shows a schematic plan view of the first embodiment of the invention.

FIG. 3 shows a plan view of the embodiment of FIG. 1. The supporting web 18 passes over into the widening web 12 in the direction of the web 5. While the supporting web 18 and the widening web 12 comprise an essentially constant cross-section, the region of the connecting section 3 located within the webs 12, 18 enlarges on both sides of the connecting opening 7 in the direction of the shortening member 4.

On the side facing away from the shortening member 4, the web 5 comprises rib-like extensions 20 which permit high stiffness of the web 5 with a simultaneously low weight.

To facilitate the introduction of an end link into the anchoring receptacle 6, the basic body 2 of the shortening device 1 is provided with an indentation 21 in the region of the anchoring receptacle 6, the indentation being essentially funnel-shaped and its surfaces surrounding the anchoring receptacle 6 guide a placed chain link in the direction of the slot 10.

Figures 4, 5:
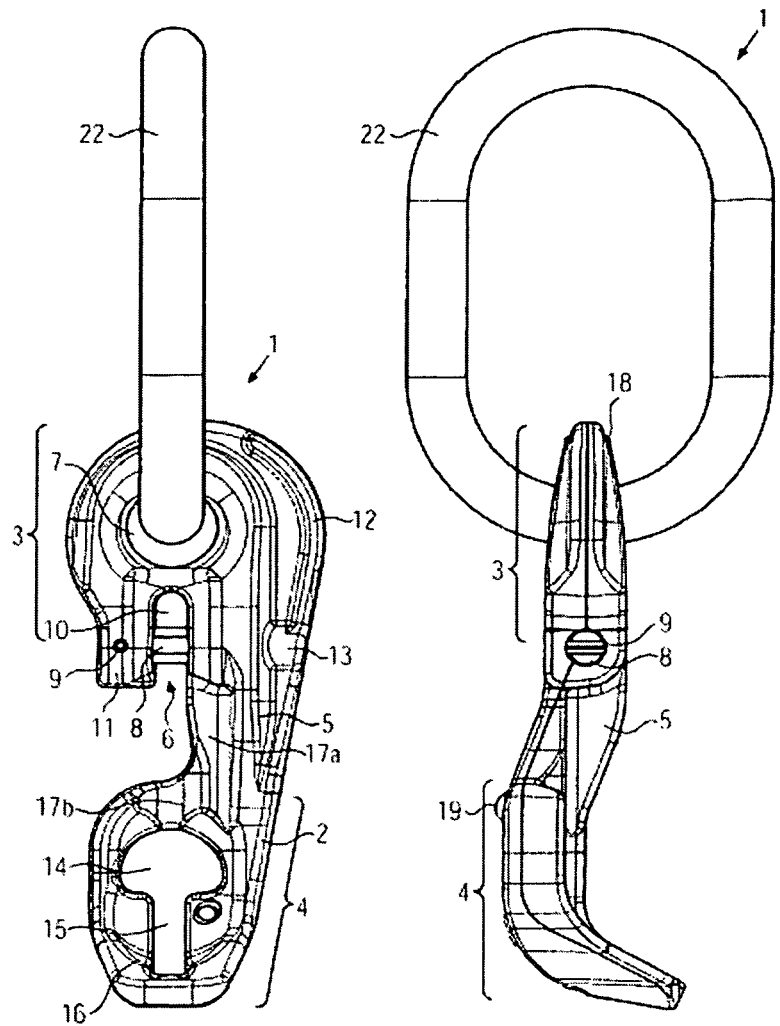
FIG. 4 shows a schematic side view of a second embodiment of the invention, differing from the embodiment shown in FIG. 1 by the connecting member welded into the connecting opening.
FIG. 5 shows a second schematic side view of the second embodiment of the invention.

FIG. 4 shows a second embodiment of the shortening device according to the invention, wherein for elements whose function and construction correspond to the elements of the embodiment of FIG. 1, the same reference numerals are used. To keep the description short, here the differences to the embodiment of FIG. 1 are discussed.

A connecting member 22 is inserted in the connecting opening 7, which is closed, for example, by a weld seam. Thereby, the connecting member 22 matching the shortening device 1 is necessarily always inserted in the associated connecting opening and captively connected to the connecting section 3 of the shortening device 1.

Figures 6, 7:
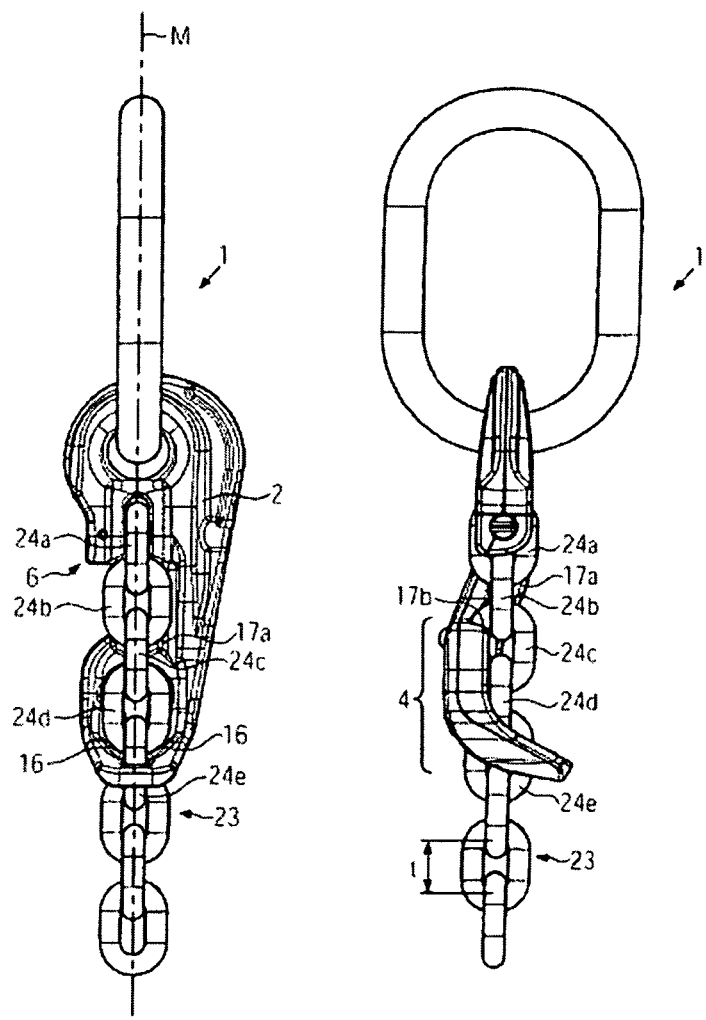
FIG. 6 shows another schematic side view of the second embodiment of the invention, differing from the embodiment shown in FIG. 4 by the chain fitted in the anchoring receptacle.
FIG. 7 shows another schematic side view of the embodiment of FIGS. 4 and 5 with a chain fitted in the anchoring receptacle.

FIG. 6 shows the embodiment of FIGS. 4 and 5 with a not shortened chain strand 23 fitted in the anchoring receptacle 6. The end link 24*a* of the chain strand 23 is inserted in the slot 10 of the anchoring receptacle 6 and held by the retaining pin 8 penetrating the clear diameter. Due to the design of the basic body 2, the not shortened chain 23 is not deflected by the shortening device but is hanging straightly extended downwards starting from the anchoring receptacle 6. Thereby, the distribution of the pulling force transmitted by the shortening device extends along a common, straight central line M of the connecting member 22 and the extended chain 23. Equally, the shortening device 1 or the basic body 2, respectively, is not deflected by the chain 23. The shortening device 1 or the basic body 2, respectively, is rather hanging in a neutral position which the shortening device 1 or the basic body 2, respectively, also assumes without a chain 23 being fitted.

FIG. 7 shows the embodiment of FIGS. 4 to 6 with an anchored chain 23 according to FIG. 6. Due to the indentations 17*a* or the cutouts 17*a*, the chain link 24*b* is not lying against the basic body 2 when the chain is extended. As an alternative, the indentation 17*a* can be embodied such that the chain link 24*b* is lying against the basic body 2, but is not deflected by the same. Correspondingly, the indentation 17*b* prevents a deflection of the chain link 24*c* following the chain link 24*b* or a surface contact of the chain link 24*c* with the basic body 2 in the shortening member 4.

The chain link 24*d* is arranged just above the supporting surfaces 16 when the chain 23 is extended, so that this chain link 24*d* is neither deflected by a contact with the basic body 2 or the shortening member 4, respectively. FIG. 8 shows the embodiment of FIGS. 4 to 7, the chain 23 of FIG. 8 being minimally shortened. The minimum amount of the shortening of the chain 23 only corresponds to twice the pitch t of the chain links. The chain link 24*f* essentially arranged transversely to the insertion slot 15 here rests on the supporting surfaces 16 of the shortening member 4. By rotating the bow of the chain link 24*f* pointing away from the shortening member 4, the chain links 24*b* to 24*d* lying above it are moved away from the web 5, so that sufficient space is formed for this shortened part of the chain 23.

FIG. 9 shows a further side view of the embodiment of FIGS. 6 to 8 with a shortened chain strand 23 according to FIG. 8, where a section of the shortening member 4 is represented in a section. While the chain link 24*f* rests on the supporting surfaces 16, the following chain link 24*d* is adjacent to a supporting surface 25 which corresponds to the surface of the cross bar 15*b* pointing inwards.

FIG. 10 shows a further embodiment of the shortening device, wherein for elements whose function and construction correspond to the elements of the embodiment of FIG. 1, the same reference numerals are used. To keep the description short, here the differences to the embodiment of FIG. 1 are discussed.

In this shortening device 1 according to the invention, the shortening member 4 is designed as shortening hook 26. The slot-like hook opening 27 points in the direction of the anchoring receptacle 6, wherein the bisecting line S of the insertion slot 27 corresponds to the bisecting line S of the anchoring receptacle 6 as well as the connecting opening 7. To prevent a chain link placed in the insertion slot 27 from slipping out of the insertion slot 27, a locking member 28 is provided. Lateral grooves 29 at the shortening member 26 prevent a slipping or shifting of the chain links which follow the chain link inserted in the insertion slot 27 when a chain strand is shortened.

FIG. 11 shows a sectional view of the embodiment of FIG. 10 at the site XI-XI. The chain links of a chain strand inserted in the shortening member are supported by supporting surfaces 31*a*, 31*b*, 31*c*. The hook aperture 27 comprises widenings 30 which widen the supporting surface 31*a*. Furthermore, the shortening member 26 comprises supporting surfaces 31*c* which support the chain links following the chain link resting on the supporting surface 31*a* against twisting.

FIG. 12 shows a sectional view of the embodiment of FIG. 10 at the site XII-XII. The end of the retaining pin 8 pointing in the longitudinal direction L is arranged in a blind hole 32*a* on the side facing the web 5. The blind hole 32*a* is aligned with a through hole 32*b* in the extension 11 of the connecting section 3 in which the end of the retaining pin 8 pointing away from the web 5 is held. The end of the blind hole 32*a* pointing away from the retaining pin 8 forms a stop for the retaining pin 8, so that its end position in the blind hole 32*a* is fixed. As an alternative, a stepped hole 32*a* can be provided instead of the blind hole 32*a*. The stepped hole 32*a* comprises a through hole whose end facing the retaining pin 8 comprises approximately the diameter of the retaining pin 8, while its end facing away from the retaining pin 8 is provided with a reduced diameter. The reduced diameter of the stepped hole 32*a* thus forms a stop for the retaining pin 8 and simultaneously an opening through which the retaining pin 8 can be knocked out, for example by means of a mandrel.

The retaining pin 8 is secured against slipping out by a locking pin 9 which extends transversely to the longitudinal direction L and intersects the through hole 32*b*.

FIG. 13 shows a sectional view of the embodiment of FIG. 10 at the site XIII-XIII of FIG. 10. The essentially flat supporting surface 31*a* is enlarged by the widenings 30. The supporting surfaces 31*b* are angled with respect to the direction of load B.

FIG. 14 shows an enlarged schematic representation of the detail XIV of FIG. 13. The locking member 28 is rotatably held in the shortening member 26 via a pin 33. The pin 33 comprises widenings 34, 35 at both ends which ensure a form-fit support of the locking member 28.

Figures 15, 16:
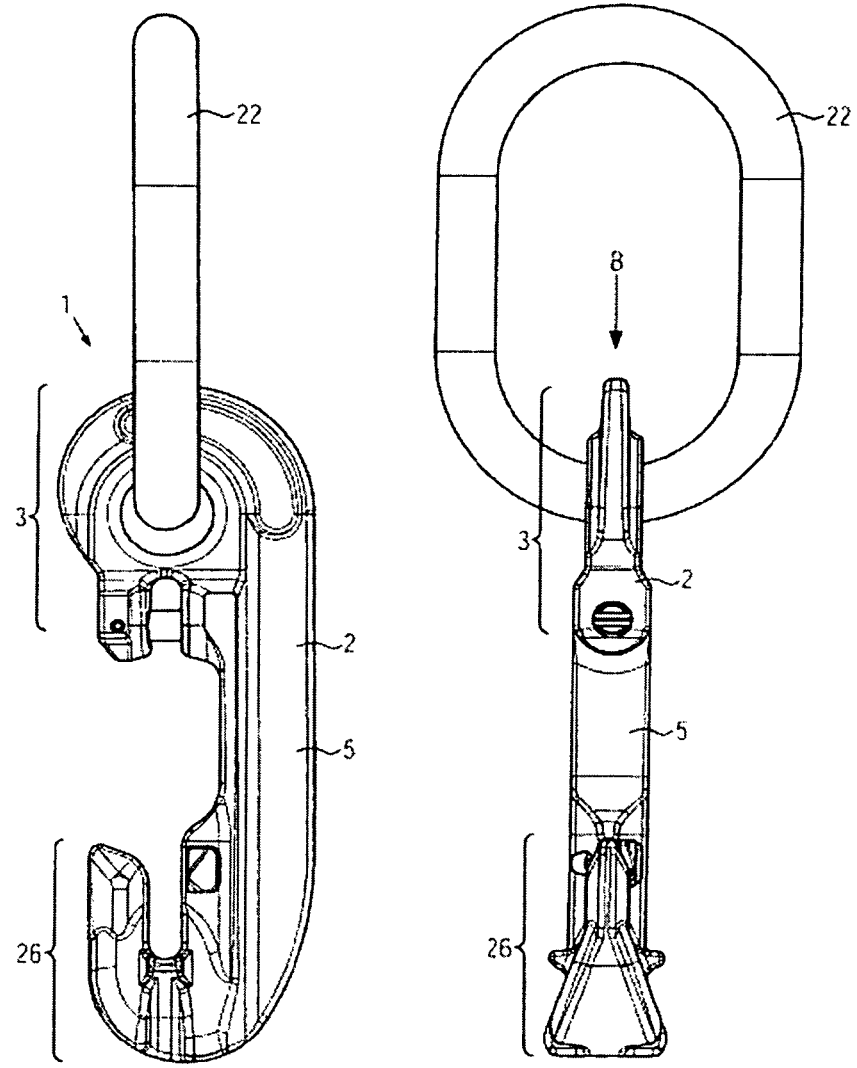
FIG. 15 shows a schematic side view of a fourth embodiment of the invention, differing from the embodiment shown in FIG. 10 by the welded-in connecting member.
FIG. 16 shows another schematic side view of the fourth embodiment according to FIG. 15.

FIGS. 15 and 16 show a fifth embodiment, where for elements whose function and construction correspond to the elements of the embodiment described up to now, the same reference numerals are used. To keep the description short, here the differences to the embodiment of FIG. 10 are discussed.

The shortening device 1 of FIGS. 15 and 16, too, comprises a shortening member 26 designed as shortening hook 26. The shortening device 1 comprises a connecting member 22 which is inserted in the connecting opening 7 and closed by a weld seam.

Figures 17, 18:
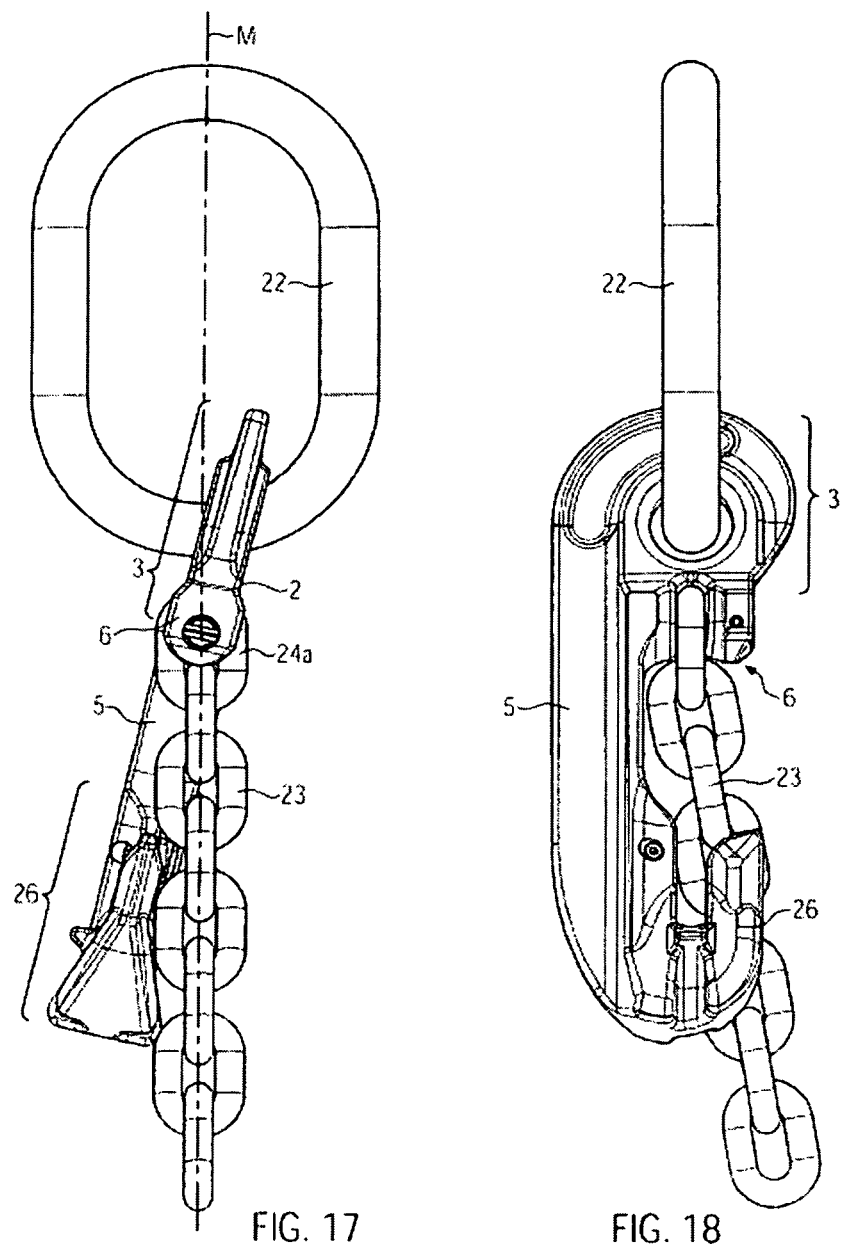
FIG. 17 shows another schematic side view of the fourth embodiment with a not shortened chain strand.
FIG. 18 shows another schematic side view of the fourth embodiment according to FIG. 17.

FIG. 17 shows the embodiment of FIGS. 15 and 16 with a chain 23 of which the end link 24*a* is inserted in the anchoring receptacle 6. When the chain 23 is not shortened, the shortening member 26 is laterally lying against the chain 23. For this reason, the basic body 2 is laterally shifted and slightly twisted with respect to the connecting member 22 while the chain 23 is extended straightly. The connecting member 22 and the chain 23 comprise a common central line M on which the distribution of forces of the connecting member 22 and the extended chain 23 is lying in case of a tensile load on the shortening device 1. Thus, the distribution of forces runs along a straight line, and no moments are transmitted to the connecting member 22.

FIG. 18 shows a further side view of the embodiment of FIGS. 15 to 17 according to FIG. 17 with a not shortened chain 23. The chain 23 is freely swiveling due to the distance between the anchoring receptacle 6 and the shortening member 4 which is caused by the web 5, without a vertical force being exerted on the shortening member 26 when a tensile load acts on the chain 23.

Figure 19:
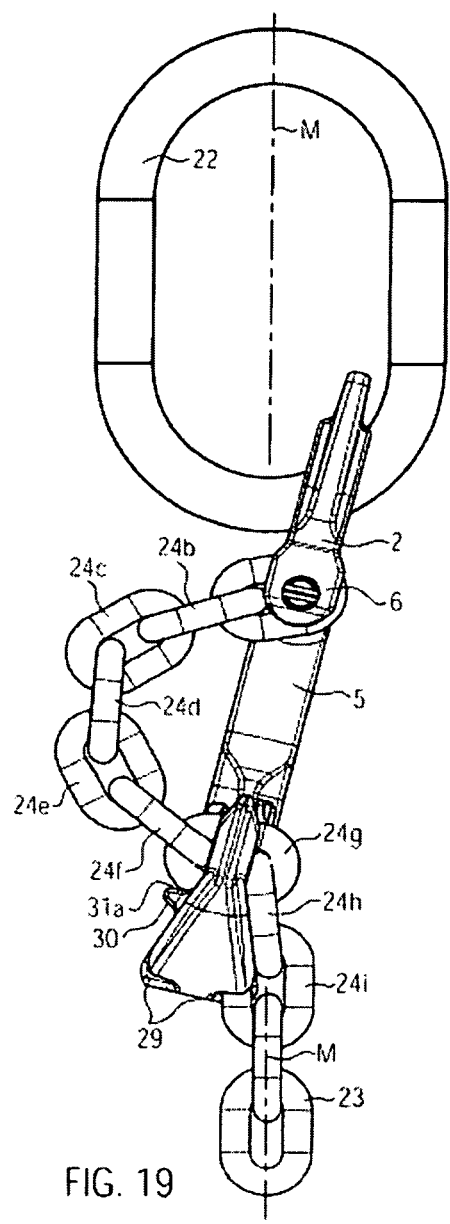
FIG. 19 shows another schematic side view of the fourth embodiment with a shortened chain strand.

FIG. 19 shows the embodiment of FIGS. 15 to 18 with a shortened chain 23. The chain 23 is shortened by the minimum amount of approximately three times the pitch t of the chain links. The chain link 24g is received in the hook aperture 27 and rests on the supporting surface 31a with the outer surface of its lower longitudinal leg. The adjacent chain link 24f forms, with the chain links 24a to 24e lying above it, an arc that ends in the anchoring receptacle 6. The chain link 24h following the chain link 24e and hanging downwards rests on the lateral, bent supporting surface 31b with both longitudinal legs. The chain link 24i following the chain link 24h downwards, however, is arranged in the groove 29 which supports the chain link 24i via the lateral supporting surfaces 31c against twisting. As in the not shortened chain according to FIG. 17, the connecting member 22 and the extended section of the chain 23 comprise a common central line M on which the distribution of forces of the connecting member 22 and the chain 23 is lying in case of a tensile load on the shortening device 1. Thereby, the distribution of forces runs along a straight line even if the chain is shortened, and no moments are transmitted to the connecting member 22.

Figure 20:
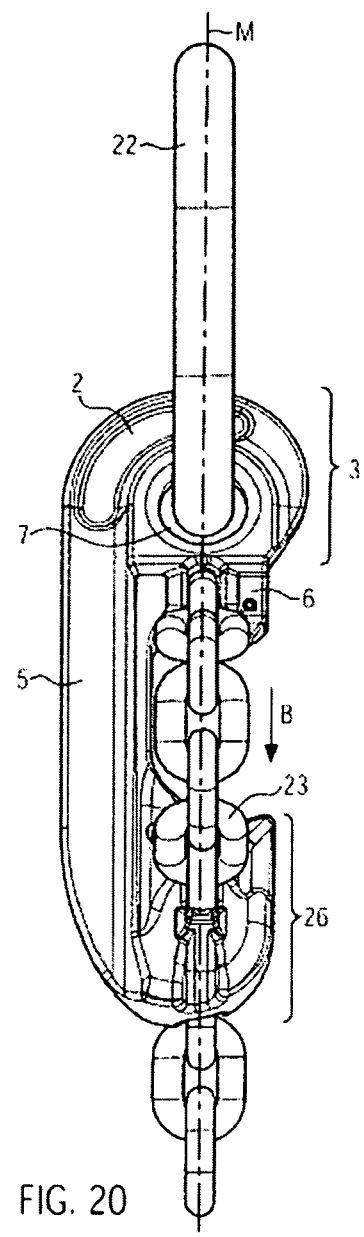
FIG. 20 shows another schematic side view of the fourth embodiment according to FIG. 19.

FIG. 20 shows the embodiment of FIGS. 15 to 19 in a further schematic side view with a shortened chain according to FIG. 19. The chain 23 extends in the shown observation direction in a straight line in the direction of load B.

The invention claimed is:

1. Shortening device (1) for shortening a chain strand (23), comprising a connecting section (3) with at least one connecting opening (7),
a shortening member (4, 26),
at least one anchoring receptacle (6) for receiving an end link (24a) of the chain strand (23) which anchoring receptacle (6) is arranged at a side of the connecting section (3) facing the shortening member (4, 26) and closed by a retaining pin (8) inserted in a cutout (32),
and a web (5) connecting the connecting section (3) with the shortening member (4, 26), which web (5) is arranged at an end of the retaining pin (8) pointing in the longitudinal direction, wherein the shortening device (1) comprises a basic body (2) comprising the connecting section (3), the shortening member (4, 26), the web (5) connecting the connecting section (3) with the shortening member (4, 26) as well as the anchoring receptacle, characterized in that
the connecting opening (7) is embodied as a closed eye (7) and the anchoring receptacle (6) is formed by a separate opening (10).

2. Shortening device (1) according to claim 1, characterized in that the clear diameter (W2) of the anchoring receptacle (6) is smaller than or equal to the diameter of the retaining pin (8).

3. Shortening device (1) according to claim 1, characterized in that the clear diameter (W2) of the anchoring receptacle (6) is smaller than or equal to half the clear diameter (W1) of the connecting opening (7).

4. Shortening device (1) according to claim 1, characterized in that the distance between the retaining pin (8) and the shortening member (4, 26) arranged underneath the retaining pin (8) corresponds to at least four times the pitch (t) of the links of the chain strand (23) of which the end link (24a) can be received at the anchoring receptacle (6).

5. Shortening device (1) according to claim 1, characterized in that the one end of the retaining pin (8) is held in a blind hole (32a) or a stepped hole, and the other end of the retaining pin (8) is held in a through hole (32b) closable by a locking pin (9).

6. Shortening device (1) according to claim 1, characterized in that the shortening member (4, 26) is formed by two hooks being in connection with each other via a back and being arranged essentially in parallel, the hooks limiting an insertion slot and forming a pocket for receiving a chain link following the chain link inserted in the insertion slot.

7. Shortening device (1) according to claim 1, characterized in that the shortening member (4, 26) comprises a pull-through opening (14), an insertion slot (15a) ending in the pull-through opening (14), and a cross yoke (15b) connecting the ends of the side walls of the slot (10) facing away from the pull-through opening (14).

8. Shortening device (1) according to claim 1, characterized in that the shortening member (26) is formed as shortening hook (26) which comprises an insertion slot (27) essentially opening in the direction of the connecting section (3).

9. Shortening device (1) according to claim 6, characterized in that the clear diameter (W2) of the anchoring receptacle (6) is approximately equal to the clear diameter (W3) of the insertion slot (15a).

10. Shortening device (1) according to claim 1, characterized in that the distance from the end of the connecting opening (7) pointing away from the anchoring receptacle (6) to the end of the opening (10) of the anchoring receptacle (6) pointing away from the connecting opening (7) is smaller than or equal to 1.25 times the sum of the clear diameter (W2) of the anchoring receptacle (6) and the clear diameter (W1) of the connecting opening (7).

11. Shortening device (1) according to claim 1, characterized in that a connecting member (22) closed by a weld seam is received in the connecting opening (7).

12. Shortening device (1) according to claim 2, characterized in that the clear diameter (W2) of the anchoring receptacle (6) is smaller than or equal to half the clear diameter (W1) of the connecting opening (7).

13. Shortening device (1) according to claim 2, characterized in that the distance between the retaining pin (8) and the shortening member (4, 26) arranged underneath the retaining pin (8) corresponds to at least four times the pitch (t) of the links of the chain strand (23) of which the end link (24a) can be received at the anchoring receptacle (6).

14. Shortening device (1) according to claim 2, characterized in that the one end of the retaining pin (8) is held in a blind hole (32a) or a stepped hole, and the other end of the retaining pin (8) is held in a through hole (32b) closable by a locking pin (9).

15. Shortening device (1) according to claim 2, characterized in that the shortening member (4, 26) is formed by two hooks being in connection with each other via a back and being arranged essentially in parallel, the hooks limiting an insertion slot and forming a pocket for receiving a chain link following the chain link inserted in the insertion slot.

16. Shortening device (1) according to claim 2, characterized in that the shortening member (4, 26) comprises a pull-through opening (14), an insertion slot (15a) ending in the pull-through opening (14), and a cross yoke (15b) connecting the ends of the side walls of the slot (10) facing away from the pull-through opening (14).

17. Shortening device (1) according to claim 2, characterized in that the shortening member (26) is formed as shortening hook (26) which comprises an insertion slot (27) essentially opening in the direction of the connecting section (3).

18. Shortening device (1) according to claim 7, characterized in that the clear diameter (W2) of the anchoring receptacle (6) is approximately equal to the clear diameter (W3) of the insertion slot (15*a*).

19. Shortening device (1) according to claim 8, characterized in that the clear diameter (W2) of the anchoring receptacle (6) is approximately equal to the clear diameter (W3) of the insertion slot (15*a*).

20. Shortening device (1) according to claim 2, characterized in that the distance from the end of the connecting opening (7) pointing away from the anchoring receptacle (6) to the end of the opening (10) of the anchoring receptacle (6) pointing away from the connecting opening (7) is smaller than or equal to 1.25 times the sum of the clear diameter (W2) of the anchoring receptacle (6) and the clear diameter (W1) of the connecting opening (7).

\* \* \* \* \*